United States Patent [19]

Watanabe et al.

[11] Patent Number: 4,576,726
[45] Date of Patent: Mar. 18, 1986

[54] MAGNETIC COATING COMPOSITION

[75] Inventors: Masato Watanabe, Nara; Yuzo Ozaki, Osaka, both of Japan

[73] Assignee: Toyo Tire & Rubber Company Limited, Japan

[21] Appl. No.: 571,957

[22] Filed: Jan. 19, 1984

[30] Foreign Application Priority Data

Jan. 25, 1983 [JP] Japan .................................. 58-10908
Mar. 24, 1983 [JP] Japan .................................. 58-50079
Apr. 15, 1983 [JP] Japan .................................. 58-67646

[51] Int. Cl.$^4$ .......................... C04B 35/04; H01F 1/00
[52] U.S. Cl. ................................ 252/62.54; 360/134; 427/128; 428/425.9; 428/900
[58] Field of Search ...................................... 252/62.54

[56] References Cited

U.S. PATENT DOCUMENTS

| 3,574,684 | 4/1971 | Higashi | 252/62.54 |
| 4,286,022 | 8/1981 | Virmillion et al. | 252/62.54 |
| 4,370,383 | 1/1983 | Kawahara | 252/62.54 |
| 4,420,601 | 12/1983 | Kuroda et al. | 252/62.54 |

Primary Examiner—Arthur P. Demers
Attorney, Agent, or Firm—Murray, Whisenhunt and Ferguson

[57] ABSTRACT

A magnetic coating composition comprising a modified polyurethane resin containing hydroxyl groups at a high concentration, a magnetic powder and, when required, a polyfunctional isocyanate compound.

3 Claims, No Drawings

MAGNETIC COATING COMPOSITION

The present invention relates to a magnetic coationg composition.

Recently, higher properties are required of magnetic materials for magnetic recording. While it is important to improve magnetic particles for this purpose, the binder to be used for coating a tape or like substrate with magnetic particles is also one of the important factors.

Generally polyurethane resin which gives flexible tough coatings is often used as a surface coating resin for producing magnetic tapes and the like. However, the conventional polyurethane has low ability to disperse magnetic particles, which is therefore compensated for by the use of soybean lecithin or the like as a dispersant, whereas this agent produces adverse effects such as bleeding during long-term use. To improve the dispersing ability, the resin is used conjointly with a resin having good dispersing ability, such as nitrocellulose, polyvinyl butyral or vinyl chloride/vinyl acetate/vinyl alcohol copolymer, but the use of such resin results in the drawback of poor abrasion resistance and flexibility.

Various research has been conducted to overcome these drawbacks. For example, magnetic recording materials are known which are disclosed in Published Unexamined Japanese Patent Applications (1) No. 44902/1976, (2) 44903/1976, (3) 139634/1980, (4) 139636/1980, (5) 68925/1981, (6)~(9) 101643/1981 to 101646/1981, etc. Urethane-modified epoxy resins containing no OH group are used, for example, in (1) and (2), while urethane resins containing OH groups are used in (3) to (9). However, these resins are not modified with an epoxy resin, usually have about 1 to 5 OH groups, exhibit somewhat improved but still insufficient dispersing ability and further have the drawback of being poor in resistance to hydrolysis, resistance to heat, etc.

Also known is a material wherein at least trifunctional hydroxy compound, such as glycerin, is used as a polyol component of an OH-containing polyurethane as disclosed in (10) Published Unexamined Japanese Patent Application No. 60529/1982. With the disclosed technique, however, gelation occurs if the NCO/OH ratio is made close to 1 in order to increase the OH concentration and the molecular weight, whereas if the NCO/OH ratio is lowered to avoid the objection, a reduced molecular weight will result to entail the drawback that the coating obtained has low strength. Furthermore, a polyurethane elastomer incorporating a specific isocyanate and an epoxy resin are used in (11) Published Unexamined Japanese Patent Application No. 158022/1982, but the mixture still remains to be improved.

An object of the present invention is to provide a magnetic coating composition which is greatly improved in the dispersibility of magnetic particles.

Another object of the invention is to provide a magnetic coating composition which is outstanding in resistance to hydrolysis and heat, film hardness, compatibility with other resins and like properties.

The above and other objects will be apparent from the following description.

The present invention provides a magnetic coating composition comprising a magnetic powder and a modified polyurethane resin containing hydroxyl groups at a high concentration.

The modified polyurethane resin of the invention is prepared by various processes.

For example, the modified polyurethane resin of the invention may be one prepared by ring-opening epoxy groups of an epoxy-modified polyurethane resin with an amine and/or a carboxylic acid to form hydroxyl groups. Further the modified polyurethane resin of the invention may be one prepared by reacting a polyol, isocyanate compound and dihydroxycarboxylic acid having two hydroxyl groups and a carboxyl group to obtain a carboxyl-containing polyurethane resin and reacting the resin with an epoxy compound. Further the modified polyurethane resin of the invention may be one prepared by ring-opening epoxy groups of an epoxy compound with an amine and/or a carboxylic acid to obtain a ring-opened epoxy compound having hydroxyl group and reacting the compound with an isocyanate compound. According to the invention, a magnetic coating composition can be prepared also by admixing a magnetic powder with the ring-opened epoxy compound.

Epoxy groups of the epoxy-modified polyurethane or epoxy compound used are subjected to ring opening with an amine or a carboxyl-containing compound according to the invention. The presence of many hydroxyl groups and the presence of the bisphenol skeleton of the epoxy compound produce a synergistic effect, which greatly improves the dispersibility of magnetic particles and also achieve remarkable improvements in resistance to hydrolysis, resistance to heat, film hardness, compatibility with other resins, etc.

The present invention will be described below in greater detail.

According to the present invention, the epoxy-modified polyurethane resin is obtained by carrying out a urethanizing reaction in the known manner with use of a polyol, an isocyanate compound and an epoxy compound. The epoxy-modified polyurethane resin obtained is reacted with an amine and/or a carboxylic acid for ring opening to give a modified polyurethane resin containing hydroxyl groups. In this case, a chain extender may be used when desired.

As the above polyols are used various polyesterpolyols, polyetherpolyols, other polyols. Useful examples of polyesterpolyols are polyethyleneadipate polyol, polybutyleneadipate polyol, polyethylenepropyleneadipate polyol and like adipate-polyols, terephthalic acid-polyols (for example, Vylon RUX, Vylon RV-200L, a product of Toyo Boseki Kabushiki Kaisha), polycaprolactone polyol (for example, Placcel 212, Placcel 220, a product of Daicel Ltd), etc.

Useful examples of polyetherpolyols are polyoxyethylene glycol, polyoxypropylene polyol, polyoxytetramethylene polyol, etc.

Examples of other polyols are polycarbonate polyol (for example, Desmophen 2020E, a product of Bayer, West Germany), polybutadiene polyol (for example, G-1000, G-2000, G-3000, a product of Nippon Soda Co., Ltd.; Poly bd R-45 HT, a product of Idemitsu Petrochemical Co., Ltd.), polypentadiene polyol, caster oil-polyol, etc. These polyols are usable singly or in admixture of at least two of them.

Various isocyanate compounds are usable. Examples thereof are diphenylmethane diisocyanate(MDI), 2,4-tolylene diisocyanate(2,4-TDI), 2,6-tolylene diisocyanate(2,6-TDI), tolidine diisocyanate(TODI), xylylene diisocyanate(XDI), naphthylene diisocyanate(NDI), isophorone diisocyanate(IPDI), hexamethylene diisocyanate(HDI), dicyclohexylmethane diisocyanate(HMDI), lysine diisocyanate(LDI) and like diisocyanate, triphenylmethane triisocyanate, polymethylenepolyphenyl isocyanate(PAPI), carbodiimide-modified MDI and like polyisocyanates. These isocyanate compounds are used singly or in admixture of at least two of them.

Various epoxy compounds are usable in the invention. Examples thereof are ethylene oxide, propylene oxide, epichlorohydrin and like epoxide, glycidol, glycerin glycidyl ether and like hydroxyl-containing epoxide, epikote 828, 834, 1001, 1002, 1003, 1004, 1007, 1009 (a product of Yuka Shell Epoxy Co., Ltd.), Sumiepoxy ELA 115, 117, 121, 127, 134 (Sumitomo Chemical Co., Ltd.) and like bisphenol type epoxy resin, epikote 152, 154, Sumiepoxy ESCN 220LL, 220L, 220F, 220HH and like novolak type epoxy resin, ARACAST (a product of Ciba AG) and like hydantoin type epoxy resin, etc.

Particularly preferable epoxy compounds are those having epoxy groups at both ends of the molecule and having no epoxy group in the molecule and represented by the formula below

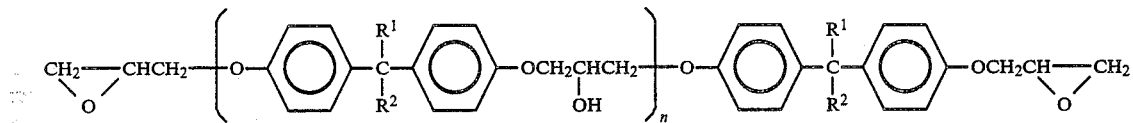

wherein n is on average a number of at least 0.1 and preferably of at least 1.

Useful examples of the amines are ethylamine, n-butylamine and like primary amines, diethylamine, dipropylamine, dibutylamine and like secondary amines, ethanolamine, N-methylethanolamine, N-butylethanolamine, diethanolamine, dipropanolamine and like alkanolamines. Examples of the carboxylic acids are acetic acid, propionic acid, stearic acid, succinic acid, adipic acid, maleic acid, benzoic acid, phthalic acid, phenylacetic acid, hydroxyacetic acid (glycolic acid), lactic acid, 2,2-dimethylolpropionic acid, 9,10,12,13-tetraoxyoctadecanoic acid, acetic anhydride, succinic anhydride, maleic anhydride, phthalic anhydride, etc. These amines and carboxylic acids are used singly or in mixture.

Useful examples of the chain extenders are 2 to 6 functional polyols having a molecular weight of up to 500, diamines having a primary or secondary terminal amino group and a molecular weight of up to 500, etc. Preferred examples of the chain extenders are:

(a) ethylene glycol, diethylene glycol, propylene glycol, dipropylene glycol, butanediol, hexanediol, glycerin, trimethylolpropane, pentaerythritol, sorbitol, 1,4-cyclohexanediol, 1,4-cyclohexanedimethanol, xylylene glycol and like polyols, (b) hydrazine, ethylenediamine, tetramethylenediamine, hexamethylenediamine, 1,4-cyclohexanediamine and like diamines, (c) ethanolamine, diethanolamine, triethanolamine and like alkanolamines, (d) hydroquinone, pyrogallol, 4,4-isopropylidenediphenol, aniline, or polyols having a molecular weight of up to 500 and prepared by reacting propylene oxide and/or ethylene oxide with the above polyols, diamines, alkanolamines in any order.

When the epoxy-modified polyurethane resin is to be prepared from the foregoing components, it is desirable to carry out the reaction in the range of usually about 0.7 to 1.2, preferably about 0.9 to 1.1, in terms of NCO index.

While it is desirable to ring-open all the epoxy groups by the above ring-opening reaction, the product may of course contain some epoxy groups remaining therein. Usually it is desirable to use about 1 equivalent amount, preferably about 0.2 to 1 equivalent amount, of an amine and/or a carboxylic acid, based on the epoxy groups. The reaction is conducted usually at about 20° to 180° C., preferably about 100° to 150° C.

The modified polyurethane resin of the invention thus ring opened has many OH groups in the molecule and has very high ability to disperse magnetic particles. It is desirable that the resin contain usually about at least 3, generally 6 to 30, more preferably 10 to 20 OH groups.

Another process for preparing the modified polyurethane resin of the invention is as follows. A polyol, an isocyanate compound, a dihydroxycarboxylic acid having two hydroxyl groups and a carboxyl group and, when desired, a chain extender are reacted to obtain a carboxyl-containing polyurethane resin, which is then reacted with an epoxy compound. The same compounds as mentioned above are usable as the polyol, isocyanate compound, chain extender and epoxy compound. Examples of dihydroxycarboxylic acid usable are 2,2-dimethylolpropionic acid (DMPA), tartaric acid, dioxyadipic acid, floionic acid, etc.

When the carboxyl-containing polyurethane is to be prepared from the above components, it is desirable that the NCO index be in the range of usually about 0.9 to 1.2, preferably about 0.95 to 1.1.

In reacting the carboxyl-containing polyurethane with an epoxy compound, all the carboxyl groups may be reacted, or some of the carboxyl groups may be course remain unreacted. Usually the ratio of epoxy groups to the carboxyl groups is preferably about 0.05 to 1.0 equivalent amount. An excess of epoxy compound, if any, is removable, for example, in a vacuum. On the other hand, the product is neutralized with a base when containing some carboxyl groups remaining therein, whereby magnetic particles can be given improved dispersibility. The reaction between the carboxyl groups and the epoxy compound is carried out usually at about 60° to 180° C., preferably about 80° to 150° C. A known catalyst is usable for this reaction.

The modified polyurethane resin of the invention can be prepared by still another process, i.e. by ring-opening epoxy groups of an epoxy compound with an amine and/or a carboxylic acid to obtain a ring-opened epoxy compound having hydroxyl groups formed therein and reacting the resulting compound with an isocyanate compound and, when desired, with a chain extender. The same compounds as already mentioned are usable as the epoxy compound, amine, carboxylic acid, isocyanate compound and chain extender.

Although it is desirable that all the epoxy groups be ring-opened by the above ring-opening reaction, some of the epoxy groups may of course remain unreacted. Usually it is desired that up to about 1 equivalent amount, preferably about 0.1 to 1 equivalent amount, of the amine and/or carboxylic acid be used based on the epoxy groups. The reaction is carried out usually at about 20° to 180° C., preferavbly about 100° to 150° C.

The modified polyurethane resin of the invention can be obtained by reacting the ring-opened epoxy compound thus prepared with an isocyanate compound. For the preparation of this polyurethane resin, it is also possible to use a prepolymer having an NCO terminal and separatedly prepared, in place of the isocyanate compound. Examples of such prepolymers are Hyprene L-100 and L-300 (product of Mitsui-Nisso Urethane Co., Ltd.), Soflanate UEX-540SS (product of Toyo Rubber & Tire Co., Ltd.), etc.

In preparing the polyurethane from the above components, the reaction is conducted usually in the range of up to 0.9, preferably about 0.2 to 0.6, in terms of NCO index.

The magnetic coating composition of the present invention is prepared by mixing together the modified polyurethane resin containing hydroxyl groups, a magnetic powder and, when required, a polyfunctional isocyanate compound. While it is suitable that the magnetic coating composition be in the range of usually 0.9 to 1.5 in NCO index, a still higher NCO index is preferred when consideration is given to the acitve hydrogen contained in the magnetic powder and other additives.

The modified urethane resin of the invention can be prepared by known methods, e.g one-shot method, prepolymer method, etc. Urethanizing catalysts are also usable. The preferred hydroxyl concentration of the modified urethane resin of the invention is at least 0.1 meq/g.

The polyfunctional isocyanate compound can be a polyisocyanate having at least two functional groups. Suitable examples are the above-mentioned various isocyanate compounds, trifunctional isocyanates obtained from trimethylolpropane and TDI (trade name "Desmodur L," product of Bayer A.G., West Germany; "Coronate L," product of Nippon Polyurethane Co., Ltd.), trifunctional isocyanates similarly manufactured by Bayer A.G. (trade names "Desmodur N-75, R and H," etc.), Hyprene L-100, Soflanate UEX-504SS, polymeric polyisocyanate (PPI), etc.

Various magnetic powders are useful for the present invention, such as those of iron, chromium, nickel, cobalt, alloys thereof, oxides thereof, modified products thereof, etc. Examples of such oxides are $\gamma$-$Fe_2O_3$, ferrite, magnetite, $CrO_2$, etc. Examples of modified products are $\gamma$-$Fe_2O_3$ doped with cobalt, berthollide compound of $Fe_2O_3$ and $Fe_3O_4$ doped with cobalt, etc. It is also possible to use magnetic powders having varying surface areas. Outstanding magnetic characteristics are obtained especially when a highly magnetic powder is used which is at least 30 $m^2$/g in specific surface area as determined from nitrogen adsorption according to the BET method. It is desirable to use about 50 to 2000 parts by weight of magnetic powder per 100 parts by weight of the modified polyurethane resin.

Insofar as the objects of the invention can be fulfilled, it is possible to incorporate into the present composition a thermoplastic polyurethane resin, vinyl chloride resin, vinylidene chloride resin, vinyl chloride/vinyl acetate/-vinyl alcohol copolymer resin (e.g. VAGH, a product of UCC), nitrocellulose, polyvinyl butyral resin, polyester resin, alkyd resin, epoxy resin, acrylonitrile-butadiene rubber and like resins.

Examples of useful thermoplastic polyurethane resins are various and include Paraprene 22S and 26S (products of Nippon Polyurethane Co., Ltd.), Estane 5702, 5703, 5711 and 5715 (products of B. F. Goodrich Chemical Co.) Pandex T-5201, 5205 and 5102A (products of Dainippon Ink & Chemicals Co., Ltd.), etc. When required, additives such as dispersant, lubricant, abrasive agent and antistatic agent which are usually used can be incorporated into the composition of the invention.

The magnetic coating composition of the invention is obtained by mixing together the above components by various known methods, for example, with use of a mixer, roll mill, ball mill, sand mill, high-speed impeller or the like. It is especially desirable to admix the polyfunctional isocyanate compound with a fully dispersed mixture since a prolonged pot life will then result. Further it is desirable to use solvents when preparing the modified polyurethane resin of the invention and when preparing the magnetic coating composition.

Preferable examples of the solvents are acetone, methyl ethyl ketone, methyl isobutyl ketone, cyclohexanone and like ketones, benzene, toluene, xylene and like aromatic hydrocarbons, ethyl acetate, butyl acetate and like esters, methyl cellosolve acetate, ethyl cellosolve acetate, 3-methoxybutyl acetate, ethylene glycol diacetate, dimethyl formamide, dimethyl acetoamide, etc.

The magnetic coating composition of the invention is applied to substrates of various forms, such as tapes, sheets, cards, disks, drums, etc. The substrate is usually about 5 to 50$\mu$, preferably about 10 to 40$\mu$, in thickness. Examples of suitable materials are polyethylene terephthalate and like polyesters, polypropylene and like polyolefins, cellulose acetate and like cellulose derivatives, polycarbonates, polyamides, polyimides, polyamideimides, etc. The magnetic coating composition can be applied to the substrate by various methods including, for example, dipping coating, air doctor coating, air knife coating, blade coating, reverse roll coating, gravure coating, cast coating, spray coating, etc. The composition applied is, when required, treated to orient the magnetic particles, or is dried when containing a usual organic solvent. The coating is dried usually at about 20° to 100° C. for at least about 5 minutes, preferably about 5 minutes to 24 hours. Preferably the dried coating is cured usually at 50° to 140° C. for about 1 minute to 2 hours. When required, the resulting material can be subjected to a surface levelling treatment or cut to the desired shape before or after hardening.

The present invention will be described in greater detail with reference to the following examples, comparison examples and test examples. The parts and percentages giving merely as such are parts by weight and percentages by weight.

EXAMPLE 1

The following ingredients were weighed out and reacted at 80° C. for 2 hours in a 2-liter separable flask equipped with a thermometer, stirrer, nitrogen gas introducingtube and condenser.

Vylon RV-200L: 280 g (0.14 mole)
Polycaprolactonediol 120 g (0.06 mole) (molecular weight: 2000):
Epikote 1001: 36 g (0.04 mole)

MDI: 76.6 g (0.306 mole)

Cyclohexanone: 156 g

Subsequently 1057 g of cyclohexanone and 7.1 g (0.06 mole) of 1,6-hexanediol were added to the reaction mixture, and the resulting mixture was further reacted at 80° C. for 3 hours to obtain an epoxy-modified polyurethane solution.

The epoxy-modified polyurethane solution (600 g) was reacted with 0.76 g of diethanolamine at 150° C. for 3 hours. No diethanolamine was detected by gas chromatography. The modified polyurethane solution obtained had a solids content of 30%, a viscosity of 280 mPa.s/25° C. and 0.12 meq/g of OH groups (4.9 in the number of OH groups).

The modified polyurethane solution (100 parts), 100 parts of magnetic powder (γ-ferrite), 4 parts of Desmodur L and 100 parts of methyl ethyl ketone were placed into a ball mill and kneaded for 24 hours to obtain a magnetic coating composition.

EXAMPLE 2

In the same manner as in Example 1 with the exception of using 1.64 g of diethanolamine was prepared a modified polyurethane solution having a viscosity of 270 mPa.s/25° C., OH content of 0.26 meq/g(OH=7.7). A magnetic coating composition was prepared in the same manner as in Example 1 with use of the above polyurethane solution.

EXAMPLE 3

In the same manner as in Example 1 with the exception of using 2.85 g of diethanolamine was prepared a modified polyurethane solution having a viscosity of 270 mPa.s/25° C., OH content of 0.45 meq/g(OH=11.5). A magnetic coating composition was prepared in the same manner as in Example 1 with use of the above polyurethane solution.

EXAMPLE 4

In the same manner in Example 1 with the exception of using 0.97 g of 2,2-dimethylolpropionic acid (DMPA) in place of diethanolamine was prepared a modified polyurethane solution having a viscosity of 280 mPa.s/25° C., OH content of 0.45 meq/g(OH=11.5). A magnetic coating compositon was prepared in the same manner as in Example 1 with use of the above polyurethane solution.

EXAMPLE 5

In the same flask as in Example 1 were placed 231 g (0.116 mole) of Vylon RV-200L. 132 g (0.066 mole) of Desmophen 2020E (molecular weight 2000), 74.3 g (0.083 mole) of Epikote 1001, 41.3 g (0.165 mole) of MDI, 33.0 g (0.149 mole) of IPDI and 155 g of cyclohexanone. The mixture was reacted at 100° C. for 3 hours. Thereto were added 1053 g of cyclohexanone and 5.9 g (0.050 mole) of 1,6-hexanediol and the mixture was further reacted at 100° C. for 4 hours to obtain an epoxy-modified polyurethane solution.

A 600 g quantity of the epoxy-modified polyurethane solution was reacted with 6.0 g of diethanolamine at 150° C. for 3 hours to prepare a modified polyurethane solution having a viscosity of 310 mPa.s/25° C. and OH content of 0.96 meq/g(OH=22.0). A magnetic coating composition was prepared in the same manner as in Example 1 with use of the above polyurethane solution.

COMPARISON EXAMPLE 1

A magnetic coating composition was prepared in the same manner as in Example 1 with the exception of using the epoxy-modified polyurethane solution before ring opening of Example 1.

COMPARISON EXAMPLE 2

A magnetic coating composition was prepared in the same manner as in Example 1 with the exception of using a solution obtained by adding 0.76 g of diethanolamine to 600 g of the epoxy-modified polyurethane solution before ring opening of Example 1 without subjecting the solution to heating reaction.

COMPARISON EXAMPLE 3

A magnetic coating composition was prepared in the same manner as in Example 5 with the exception of using the epoxy-modified polyurethane solution before ring opening of Example 5.

COMPARISON EXAMPLE 4

A mixture of 280 g (0.14 mole) of Vylon RV-200L, 120 g (0.06 mole) of polycaprolactonediol (molecular weight 2000), 65 g (0.26 mole) of MDI and 142 g of cyclohexanone was reacted at 80° C. for 2 hours. Thereto were added B 960 g of cyclohexanone and 7.1 g (0.06 mole) of 1,6-hexanediol and the mixture was further reacted at 80° C. for 3 hours to obtain a polyurethane solution having a solid concentration of 30% and a viscosity of 520 mPa.s/25° C. A magnetic coating composition was prepared in the same manner as in Example 1 with use of the above polyurethane solution.

COMPARISON EXAMPLE 5

A mixture of same amounts of Vylon RV-200L, polycaprolactonediol and MDI as in Comparison Example 4, and 141 g of cyclohexanone was reacted at 80° C. for 2 hours. Thereto were added 957 g of cyclohexanone and 5.5 g (0.06 mole) of glycerin and the mixture was further reacted at 80° C. for 3 hours to obtain a polyurethane solution having a solid concentration of 30%, a viscosity of 500 mPa.s/25° C. and OH content of 0.13 meq/g(OH=5.4). A magnetic coating composition was prepared in the same manner as in Example 1 with use of the above polyurethane solution.

COMPARISON EXAMPLE 6

A 600 g quantity of the epoxy-modified polyurethane solution before ring opening of Example 1 was reacted with 0.54 g of N-methylethanolamine in the same manner as in Example 1 to obtain a modified polyurethane solution having a solids content of 30%, a viscosity of 300 mPa.s/25° C. and OH content of 0.08 meq/g (OH=3.6). A magnetic coating composition was prepared in the same manner as in Example 1 with use of the above polyurethane solution.

EXAMPLE 6

To a 1-liter separable flask equipped with a thermometer, stirrer, nitrogen gas introducing tube and condenser were placed 242 g of Vylon RUX (molecular weight 2000), 60.6 g of MDI and 130 g of cyclohexanone. The mixture was reacted at 80° C. for 1 hour in a dried nitrogen stream. Subsequently 16.2 g of DMPA and 348 g of cyclohexanone were added to the reaction mixture, and the resulting mixture was further reacted at 80°~90° C. for 3 hours to obtain a solution(a) of polyurethane having a solids content of 40%, a viscosity of 9800 cps(25° C.) and a molecular weight of 29,000.

To the solution(a) were added 9.0 g of glycidol and 14 g of cyclohexanone. The mixture was reacted at 120°~130° C. for 8 hours to obtain a solution($A_1$) of polyurethane(A) having a solids conent of 40%, a viscosity of 8700 cps(25° C.), a molecular weight of 24000 and 0.74 meq/g of OH groups.

The above polyurethane solution($A_1$, 75 parts), 100 parts of cobalt-modified γ-ferrite, 40 parts of cyclohexanone and 110 parts of methyl ethyl ketone were placed into a ball mill and kneaded for 20 hours. Thereto was added 7.5 parts of Coronate L and the mixture was further kneaded for 2 hours to obtain a magnetic coating composition of the invention.

EXAMPLE 7

To the polyurethane solution(a) of Example 6 were added 3.0 g of glycidol, 17 g of cyclohexanone and 8.2 g of triethylamine. The mixture was reacted at 120°~130° C. for 8 hours to obtain a solution($A_2$) of polyurethane(A) having a solids content of 40%, a viscosity of 9100 1 cps (25° C.), a molecular weight of 28000 and 0.12 meq/g of OH groups.

A magnetic coating composition was prepared in the same manner as in Example 6 with the exception of using the polyurethane solution($A_2$).

EXAMPLE 8

A mixture of 171 g of polycaprolactonediol (molecular weight 550), 108 g of TDI-100 and 120 g of cyclohexanone was heated at 75°~85° C. for 1 hour. Thereto were added 41.5 g of DMPA and 361 g of cyclohexanone and the mixture was reacted at 80°~90° C. for 3 hours to obtain a solution of polyurethane having carboxyl groups.

To the solution were added 23 g of glycidol and 35 g of cyclohexanone. The mixture was reacted at 120°~130° C. for 8 hours to obtain a solution($A_3$) of polyurethane(A) having a solids content of 40%, a viscosity of 7900 cps(25° C.), a molecular weight of 28000 and 1.81 meq/g of OH groups.

A magnetic coating composition was prepared in the same manner as in Example 6 with the exception of using the polyurethane solution($A_3$).

COMPARISON EXAMPLE 7

A magnetic coating composition was prepared in the same manner as in Example 6 except that the polyurethane(a) of Example 6 was used in place of the polyurethane solution($A_1$).

COMPARISON EXAMPLE 8

To the polyurethane(a) of Example 6 were added 9.0 g of glycidol and 14 g of cyclohexanone without subjecting the mixture to heating reaction to obtain 40% cyclohexanone solution.

A magnetic coating composition was prepared in the same manner as in Example 6 except that the above solution was used in place of the polyurethane solution($A_1$).

COMPARISON EXAMPLE 9

A solution of polyurethane(a) was prepared in the same manner as in Example 6 with the exception of using Vylon RUX(276 g), MDI(40.6 g), DMPA(3.3 g) and cyclohexanone (136 g and 344 g).

To the solution(a) were added 2.3 g of epichlorohydrin and 3 g of cyclohexanone. The mixture was reacted in the same manner as in Example 6 to obtain a solution of polyurethane(A) having a solids content of 40%, a viscosity of 9200 cps(25° C.), a molecular weight of 29000 and 0.08 meq/g of OH groups.

A magnetic coating composition having a low OH concentration was prepared in the same manner as in Example 6 with the exception of using the above polyurethane solution.

COMPARISON EXAMPLE 10

To 480 g of cyclohexanone was dissolved 246 g of SU-450 (a polyol having a OH value of 450, a product of Mitsui Nisso Urethane Co., Ltd.). To the solution was added 73.8 g of MDI and the mixture was reacted at 80° C. for 3 hours to obtain a solution of low molecular polyurethane having a solids content of 40%, a viscosity of 230 cps(25° C.), a molecular weight of 3400 and 4.3 meq/g of OH groups.

A magnetic coating composition was prepared in the same manner as in Example 6 with the exception of using the above polyurethane solution.

TEST EXAMPLE 1

A film was prepared by adding 10 parts of Coronate L to 100 parts of each polyurethane solution of Examples 6 and 8 and Comparison Examples 7 and 10, thoroughly kneading the mixture, casting the mixture on a polyester film to obtain a coating of 0.2 mm in thickness, evaporating off the solvent and curing the resulting coating at 80° C. for 24 hours. The resulting film was subjected to Taber abrasion test under the conditions of: abrasive wheel CS-17, load 1000 g, number of revolutions 3000 r.p.m. and temperature 20° C. Table 1 shows the amount of abrasion of each film.

TABLE 1

| | Amount of abrasion(mg) |
|---|---|
| Example 6 | ~0 |
| Example 8 | ~0 |
| Com. Ex. 7 | ~0 |
| Com. Ex. 10 | 25 |

EXAMPLE 9

To a 2-liter seperable flask equipped with a thermometer, stirrer, nitrogen gas introducing tube and condenser were placed 380 g of Epikote 828 (epoxy equivalent EE=190, molecular weight 380), 885 g of cyclohexanone and 210 g of diethanolamine. The mixture was reacted at 120° C. for 3 hours in a dried nitrogen stream to obtain a solution(I) of ring opened epoxy resin having a solids content of 40%, a viscosity of 160 cps(25° C.) and 1.0 meq/g of OH groups.

The above solution(I, 37.5 parts), 100 parts of γ-$Fe_2O_3$, 10 parts of a thermoplastic polyurethane resin (Estane 5703), 65 parts of cyclohexanone and 88 parts of methyl ethyl ketone were placed into a ball mill and kneaded for 24 hours. Thereto was added 8 parts of Coronate L and the mixture was further kneaded for 2 hours to obtain a magnetic coating composition of the invention.

EXAMPLE 10

A solution(II) of ring opened epoxy resin having a solids content of 40%, a viscosity of 80 cps(25° C.) and 5.0 meq/g of OH groups was prepared in the same manner as in Example 9 with the exception of using 376.6 g of Epikote 152(EE=176), 224.7 g of diethanolamine and 902 g of cyclohexanone.

A magnetic coating composition was prepared in the same manner as in Example 9 with the exception of using the above solution(II).

EXAMPLE 11

A mxture of 800 g of the solution(I) of ring opened epoxy resin, 12.5 of MDI and 19 g of cyclohexanone was reacted at 80° C. for 3 hours in a dried nitrogen stream to obtain a solution(III) of polyurethane having a solids content of 40%, a viscosity of 1080 cps(25° C.) and 0.62 meq/g of OH groups.

A magnetic coating composition was prepared in the same manner as in Example 9 with the exception of using the aove polyurethane solution(III).

COMPARISON EXAMPLE 11

A magnetic coating composition was prepared in the same manner as in Example 9 except that a 40% cyclohexanone solution of Epikote 1001 was used in place of the solution(I).

COMPARISON EXAMPLE 12

A magnetic coating composition was prepared in the same manner as in Example 9 except that a 40% cyclohexanone solution of nitrocellulose was used in place of the solution(I).

TEST EXAMPLE 2

A magnetic coating was obtained by applying the magnetic coating composition obtained to a polyester film with a doctor blade, drying the coating at room temperature for 2 hours and thereafter heating the coating in an oven at 80° C. for 24 hours for drying.

The gloss of the surface of the magnetic coating was measured by a glossmeter (S-60 of Toyo Seiki Co., Ltd.) to check the dispersibility of the magnetic powder in the composition. The higher the dispersibility, the higher is the gloss.

The magnetic coatings (other than those of Examples 6 to 8 and Comparison Examples 7 to 10) were checked for strength by humidifying the coating as placed in a constant-temperature constant-humidity chamber adjusted to 70° C. and 95% RH for 2 weeks and thereafter subjecting the coating to a search test with a pencil having a hardness of 2H. The strength was evaluated according to the criteria of:

⊙ no scratch,
Δ with scratch, and
× peeling.

Table 2 shows the results.

TABLE 2

| | Gloss | Strength | | Gloss | Strength |
|---|---|---|---|---|---|
| Ex. 1 | 66 | ⊙ | Com. Ex. 1 | 0 | ⊙ |
| Ex. 2 | 90 | ⊙ | Com. Ex. 2 | 10 | ⊙ |
| Ex. 3 | 82 | ⊙ | Com. Ex. 3 | 0 | ⊙ |
| Ex. 4 | 80 | ⊙ | Com. Ex. 4 | 0 | Δ |
| Ex. 5 | 93 | ⊙ | Com. Ex. 5 | 30 | Δ |
| Ex. 6 | 85 | — | Com. Ex. 6 | 35 | ⊙ |
| Ex. 7 | 76 | — | Com. Ex. 7 | ~0 | — |
| Ex. 8 | 88 | — | Com. Ex. 8 | 27 | — |
| Ex. 9 | 75 | ⊙ | Com. Ex. 9 | 22 | — |
| Ex. 10 | 78 | ⊙ | Com. Ex. 10 | 20 | — |
| Ex. 11 | 71 | ⊙ | Com. Ex. 11 | 5 | X |
| | | | Com. Ex. 12 | 80 | Δ |

We claim:
1. A magnetic coating composition comprising a modified polyurethane resin containing hydroxyl groups at a concentration of at least 0.1 meq/g and a magnetic powder, wherein said modified polyurethane resin is selected from the group consisting of
   (A) a resin obtained by reacting an epoxy-modified polyurethane resin with at least one of an amine or a carboxylic acid;
   (B) a resin obtained by reacting a polyurethane resin having a carboxyl group with an epoxy compound;
   (C) a resin obtained by reacting an epoxy compound with at least one of an amine or a carboxylic acid to prepare a ring-opened epoxy compound having hydroxyl groups and then reacting said ring-opened epoxy compound with an isocyanate; and
   (D) a mixture of a ring-opened epoxy compound having hydroxyl groups, prepared by reacting an epoxy compound with at least one of an amine or a carboxylic acid, and a polyurethane prepared by reacting an isocyanage compound with said ring-opened epoxy compound.
2. A composition as defined in claim 1 further comprising a polyfunctional isocyanate compound.
3. A magnetic coating composition comprising a ring-opened epoxy compound having hydroxyl groups and obtained by reacting an epoxy compound with at least one of an amine or a carboxylic acid, and a magnetic powder.

* * * * *